United States Patent [19]

Plichta

[11] Patent Number: 5,310,032
[45] Date of Patent: May 10, 1994

[54] POWER CONDUCTOR RAIL

[76] Inventor: Dietmar G. Plichta, 410 Highland Ct., Clyde, Calif. 94520

[21] Appl. No.: 73,364

[22] Filed: Jun. 7, 1993

Related U.S. Application Data

[63] Continuation-in-part of Ser. No. 49,893, Apr. 20, 1993, Pat. No. 5,263,561, which is a continuation-in-part of Ser. No. 791,809, Nov. 13, 1991, abandoned.

[51] Int. Cl.$^5$ .............................................. B60M 1/30
[52] U.S. Cl. ........................ 191/29 DM; 191/22 DM
[58] Field of Search ............. 191/22 R, 22 C, 22 DM, 191/29 R, 29 DM, 33 R, 33 PM; 238/14.05, 14.2, 14.6, 14.9, 139, 149, 184, 243, 244

[56] References Cited

U.S. PATENT DOCUMENTS

| | | | |
|---|---|---|---|
| 283,760 | 8/1883 | Draft | 191/22 C X |
| 330,605 | 11/1885 | McLaughlin | 191/29 DM X |
| 668,903 | 2/1901 | Brown | 238/14.6 |
| 1,620,496 | 3/1927 | Spieckermann | 191/29 DM |
| 2,090,156 | 8/1937 | Scholz | 191/27 X |
| 3,222,464 | 12/1965 | Dehn | 191/22 DM X |
| 3,544,737 | 12/1970 | Nowak | 191/22 DM X |
| 3,566,048 | 2/1971 | Martin | 191/22 R |
| 3,699,275 | 10/1972 | Mayo et al. | 191/29 R |
| 3,701,380 | 10/1972 | Richter et al. | 164/334 |
| 3,712,367 | 1/1973 | Plichta | 164/419 |
| 3,730,310 | 5/1973 | Springer | 191/29 DM |
| 3,757,059 | 9/1973 | Falkiner-Nuttall | 191/29 R |
| 3,836,394 | 9/1974 | Kugler et al. | 340/825.03 |
| 3,872,577 | 3/1975 | Kugler et al. | 191/27 DM X |
| 3,917,039 | 11/1975 | Maitland | 191/29 DM |
| 4,005,255 | 1/1977 | Wagner et al. | 191/29 DM X |
| 4,014,417 | 3/1977 | Kugler et al. | 191/29 DM |
| 4,429,845 | 2/1984 | Stover et al. | 191/27 X |
| 5,120,910 | 6/1992 | Bruning | 191/29 DM X |
| 5,251,732 | 10/1993 | Bruning | 191/22 DM |

FOREIGN PATENT DOCUMENTS

| | | |
|---|---|---|
| 634691 | 9/1936 | Fed. Rep. of Germany ........ 191/29 |
| 922599 | 1/1955 | Fed. Rep. of Germany . |
| 2720386 | 11/1978 | Fed. Rep. of Germany ........ 191/22 DM |
| 55-4221 | 1/1980 | Japan ............................ 191/29 DM |
| 099426 | 7/1980 | Japan ............................ 191/33 PM |
| 7140234 | 8/1982 | Japan . |
| 039532 | 3/1983 | Japan ............................ 191/33 PM |
| 143232 | 6/1986 | Japan ............................ 191/29 DM |
| 143233 | 6/1986 | Japan ............................ 191/22 DM |
| 143234 | 6/1986 | Japan ............................ 191/22 DM |
| 1295138 | 12/1986 | Japan . |
| 030849 | 2/1989 | Japan ............................ 191/29 DM |
| 034441 | 2/1990 | Japan ............................ 191/29 DM |
| 329717 | 5/1930 | United Kingdom ......... 191/29 DM |

OTHER PUBLICATIONS

Janetschke et al.; "Einfuhrung von neuen Strom-schienenanlagen mit Aluminium-Verbundstromschienen bei der Berliner U-Bahn"; 1982; pp. 2-8.

Primary Examiner—Michael S. Huppert
Assistant Examiner—Scott L. Lowe
Attorney, Agent, or Firm—Townsend and Townsend Khourie and Crew

[57] ABSTRACT

In accordance with the present invention, a power conductor rail structure is provided using a multi-metallic construction. The composite rail of the invention includes an asymmetrical steel portion having a top flange thickness greater than that of the bottom flange in a generally I-shaped configuration with spaced apertures along the length of the web. Aluminum cladding is cast onto both sides of the web with a cold rolled high conductivity layer, such as copper disposed between the aluminum and steel on either side of the web and having holes corresponding in size and shape to the apertures of the web. The aluminum cladding extends through the web apertures producing a multi-metallic sandwich construction. The high conductivity layers provide a mechanical bond between the steel and aluminum and reduces transfer resistance and increasing overall conductivity. In an alternative embodiment of the invention, the top flange is formed with openings with the aluminum cladding filling the openings so that the aluminum cladding forms part of the electrical contact surface, in one embodiment by additionally forming a continuous, longitudinally extending, aluminum filled groove in the contact surface of the rail.

11 Claims, 6 Drawing Sheets

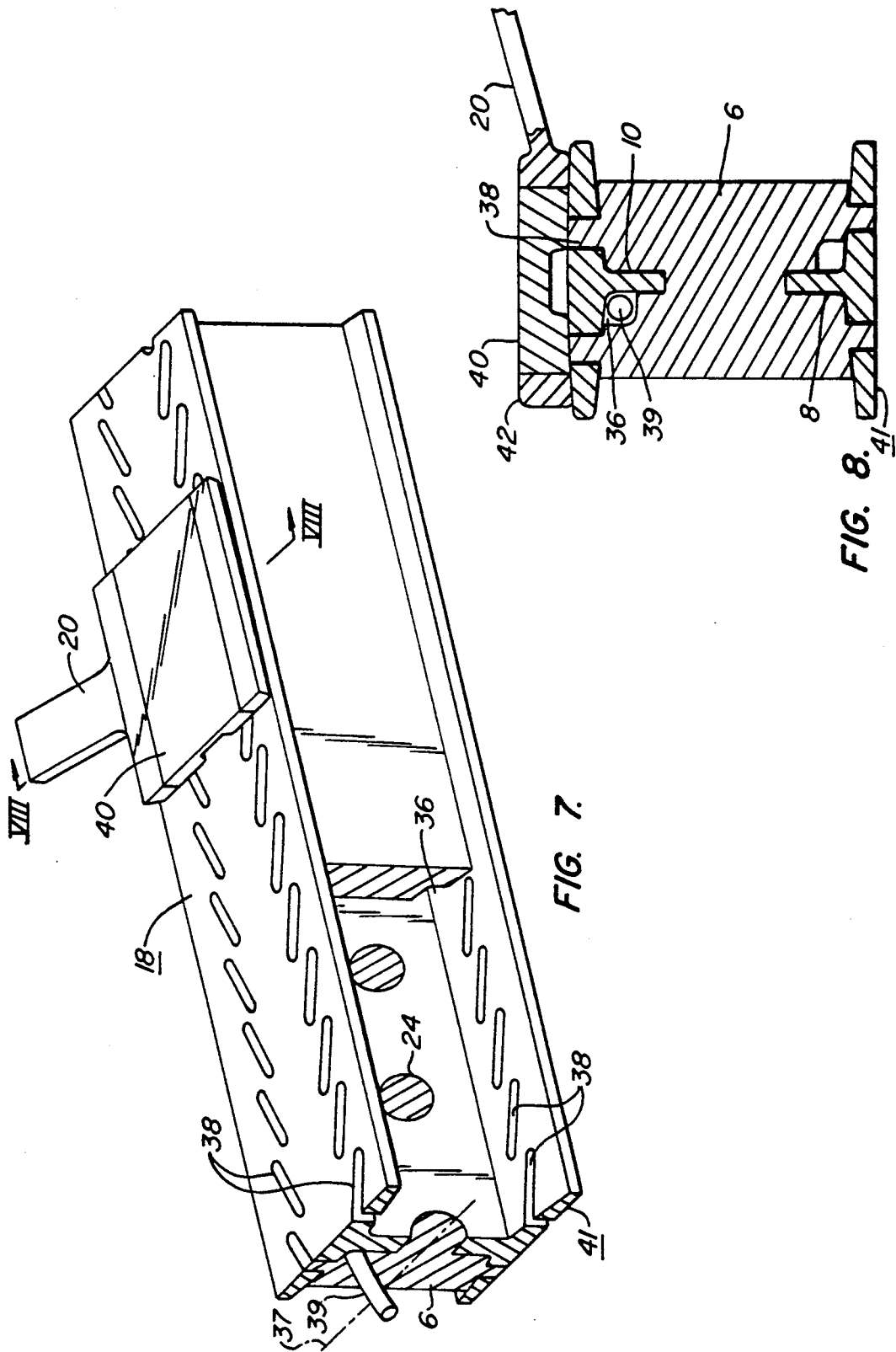

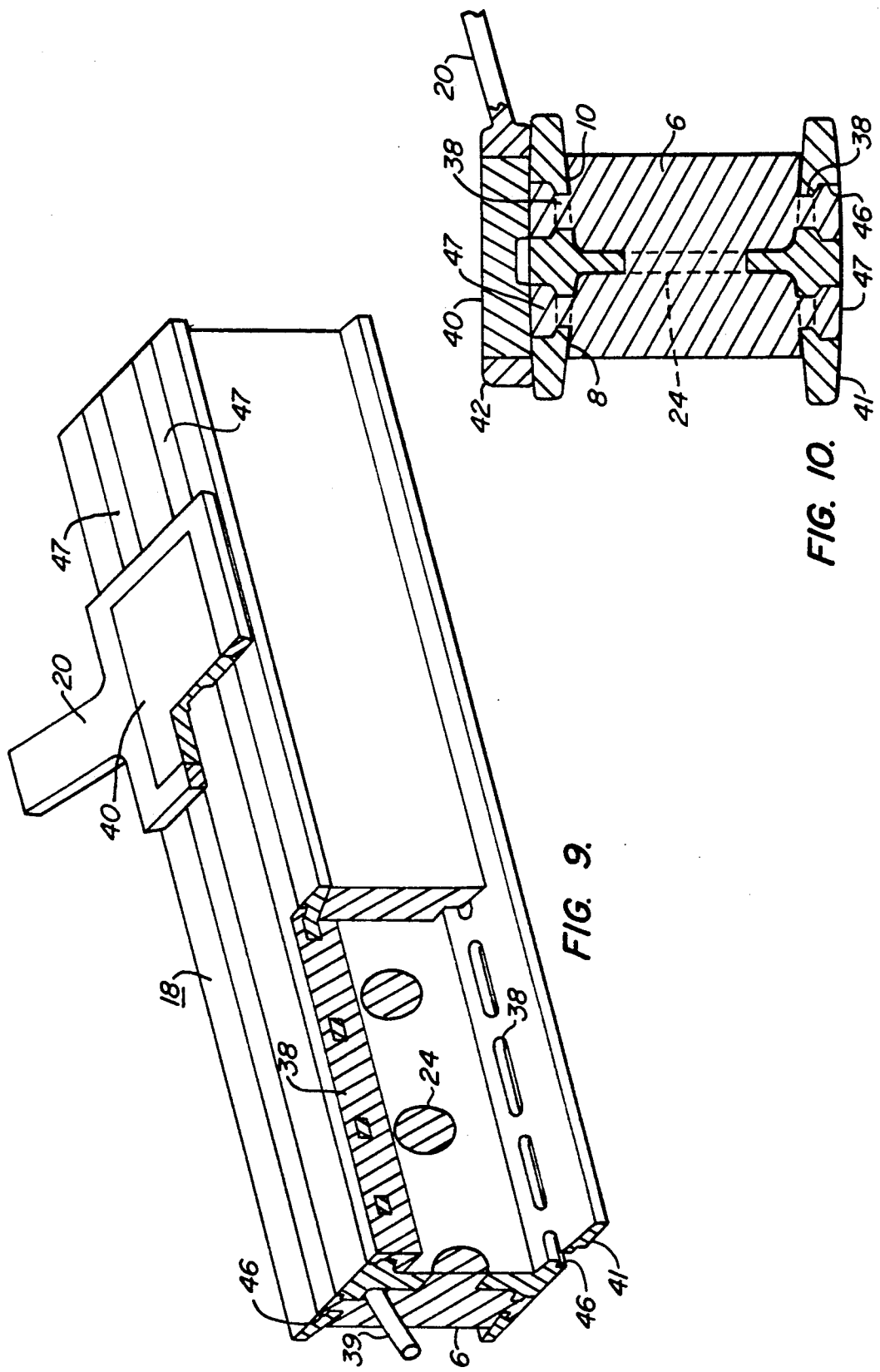

POWER CONDUCTOR RAIL

CROSS REFERENCE TO RELATED APPLICATIONS

This application is a continuation-in-part of Ser. No. 08/049,893 filed Apr. 20, 1993, now U.S. Pat. No. 5,263,561, which is a continuation-in-part of Ser. No. 07/791,809 filed Nov. 13, 1991, now abandoned.

BACKGROUND OF THE INVENTION

The invention generally relates to power conductor rails used for electrical rail transportation systems such as metro transit rail vehicles, people movers, heavy rail commuters and the like.

Electrically powered rail vehicles have long been used for mass transit systems. Electric rail systems typically employ a three-rail configuration, the rail system having two running rails to support the vehicle and a third rail to conduct the necessary electrical power. In early electric rail systems, all three rails were made of standard steel, each rail being identical in configuration. In the late 1960's, metro transit authorities and supporting manufacturing companies began experimenting with different rail structures for third rails in an effort to reduce electrical resistance and reduce weight for ease of handling and installation.

One of the first improvements was the use of an aluminum cladded rail whereby prefabricated extruded aluminum sections were bolted or clamped onto each side of a conventional steel rail web. An electrical conductor rail having non-ferrous metal extrusions secured to both sides of the steel web of the rail using bolts is disclosed in U.S. Pat. No. 3,730,310. In this structure, the aluminum cladding was preselected and secured to the steel rail web in the field by the installation personnel. Although this structure improved the electrical conductivity over prior art solid steel rails, the rail suffers inherent problems associated with the bolted construction including corrosion, electrical hot spikes, and excessive voltage loss. Bolted-on aluminum cladding structures also suffer from high weight, due to the amount of aluminum needed to provide enhanced conductivity, and high power loss due to transfer resistance between the steel rail member and the separate aluminum bar components.

U.S. Pat. No. 3,730,310 to Spiringer also discloses coating the mating surfaces of the steel beam and extrusion with an oxide inhibiting compound. The oxide inhibiting compound reduces oxidation at the mating surfaces and promotes a short term electrically conductive bond between the steel beam and the extrusion. It has been found, however, that the oxide inhibiting compound evaporates and degrades in a relatively short time. Applicant has found such compounds to be ineffective after 2 years of full exposure to the outside environment of heat, cold and humidity which is far less than the twenty five year life expectancy of the rails.

Transfer resistance, also referred to as gap resistance, is directly proportional to the contact or bond between adjoining metals in the rail structure. With bolted-on aluminum rail structures, gap resistance can be significant due to surface imperfections of the steel web, surface irregularities in the extruded aluminum bars, abrasions, nicks or dents in the aluminum caused by handling before and during installation and corrosion or contaminants positioned between the mating metals. High gap resistance between the joining metals liberally encourages electrolytic corrosion in most ambient environments, especially in high humidity environments. As a result of this increased transfer resistance, corrosion and wear, bolted-on aluminum rail structures have a higher replacement cycle than cast or fused rails.

Alternative structures and concepts have been developed by the rail manufacturing industry in the continuing effort to enhance conductivity, minimize power and voltage losses, and ultimately save energy and cost for power conductor rail systems. Conductor rails having an aluminum body with a stainless steel cap to enhance durability were developed in the 1960's. In these rail structures, the aluminum rail body is extruded then capped with steel along the upper flange contact surface to provide extended wear along the contact path where the electrical contact shoe rides along the conductor rail. The cap is secured to the aluminum with mechanical fasteners. Such a capped rail structure is disclosed, for example, in U.S. Pat. No. 3,836,394. Aluminum rails using mechanically bonded stainless steel caps to provide an electrical contact surface are, however, highly disadvantageous because of manufacturing cost and technical deficiencies. Capped aluminum rail structures are nearly four times as expensive per rail foot as a conventional steel rail and nearly twice the cost of composite steel/aluminum rails using prefabricated aluminum extrusion bars bolted or clamped to the steel rail web.

In either the bolted aluminum bar structure or the capped aluminum structure, securing the two metal structures together by mechanical fasteners and the like is undesirable due to the inherent gaps or pockets between the contact surfaces of the joining metals caused by surface imperfections as previously discussed. Furthermore, differential thermal expansion of the metallic components further compromises the metallic contact between the metals and can loosen the mechanical fastening devices employed. Once the fasteners loosen, corrosion is further accelerated by moisture access to and enlargement of the physical junction between the metals. Additionally, extruded aluminum members stress when bent to conform to curved steel rail sections. This stress strains bolted connections.

Processes have been developed to produce steel and aluminum cast composite rails having unified construction to reduce or largely eliminate resistance between the mating steel and aluminum materials and resolve other problems associated with bolted-together composite rails. These so-called "bimetal" rails, and manufacturing processes for making the same, have been developed to combine a ferrous metal, such as steel, with a more conductive metal such as aluminum during the manufacturing process to benefit from the advantages offered from each individual metal and produce a unified construction. U.S. Pat. No. 3,544,737 teaches a bimetal rail and process for making the same wherein aluminum is continuously cast about a steel rail web having preformed apertures to enhance the joining of aluminum and steel and the resultant overall conductivity of the composite rail.

Despite these alternative rail designs, the industry supplying conductor rails still strives to produce a power conductor rail structure which offers minimal electrical resistance while providing the necessary strength and durability to minimize maintenance costs. A typical standard measurement of resistance used in the conductive rail industry is ohms per one thousand feet of connected conductor rail (ohms/1,000 ft.). Typically, unit resistances in conventional conductor rails vary between 0.012 ohms/1,000 feet to 0.002 ohms/1,000 feet. A range of 0.004–0.005 ohms/1,000 ft. is common in existing rail systems using the 150 pounds/yard "New York Rail" employed since the early 1900's in the northeastern United States. The relatively high electrical unit resistance and low efficiency of the "New York Rail" and other conventional rail structures results in a tremendous waste of energy and financial resources. Conventional rail structures commonly provide only a 70% to 75% effective voltage, nearly 30% of the applied voltage is lost due to the high internal resistance of conventional rail structures and other components.

It is, therefore, desirable to have a power rail structure which provides the maximum conductivity and lowest weight per foot of rail while minimizing corrosion, transfer resistance and wear along the surface of engagement with the electrical contact shoe to thereby enhance electrical efficiency and minimize exchange and replacement of rail due to physical maintenance.

SUMMARY OF THE INVENTION

In accordance with the present invention, a power conductor rail structure is provided using multi-metallic construction. In the preferred embodiment, the composite rail includes an asymmetrical steel portion having a top flange separated from a bottom flange by a web. The top flange is made having a greater thickness than that of the bottom flange to increase longevity of wear.

Cast aluminum is mated to the web, substantially filling the space between the upper flange and the lower flange and occupying spaced apart apertures in the web to interconnect the aluminum on both sides of the web. Sandwiched between the aluminum and the steel on either side of the web is a high conductive material layer, preferably made of copper. The high conductive layer is mechanically bonded with both the aluminum and steel to provide an integral, unified structure which prevents corrosion between the adjoining metals and substantially enhances both durability and electrical efficiency. The high conductivity layer also allows reduction of the amount of aluminum needed, relative to prior art aluminum and steel bi-metallic rail structures, to provide increased electrical efficiency over conventional rail structures. Overall weight is therefore decreased.

The multi-metallic composite rail structure offers several advantages over conventional rails. The transfer resistance, or gap resistance, between the aluminum conductor and the steel base is substantially reduced by an integral high conductivity layer provided therebetween. This optimizes energy conservation including reduction of electrical loses. Preliminary calculations show that this construction can achieve an energy savings between 20% and 25% over conventional power rails fabricated from steel and approximately 12% to 15% savings over bolted, riveted or clamped composite bi-metallic rails presently offered. The transfer resistance of the present invention using a high conductivity layer of copper is approximately 600 to 800 times less than the transfer resistance of conventional steel and aluminum composite rails on the market. Furthermore, the formation of electrolytic corrosion between the aluminum and steel is effectively eliminated due to the near molecular level of the mechanical bond between the metals.

In addition, the high conductivity layer preferably has a coefficient of thermal expansion greater than the steel thereby reducing gap formation during thermal expansion. Heat is generated in the rail by the power transmission. Gaps can form between the steel and aluminum during thermal expansion since aluminum expands about twice as fast as steel. When the rail of the present invention is heated, the high conductivity layer leads the steel mass in dimensional growth so that the high conductivity layer exerts a constant pressure against the mating surfaces and provides firm bonding pressure continuously during both heating and cooling. In essence, the volume of the high conductivity layer becomes a metal bonding buffer ensuring consistent and effective physical contact between the mating metal surfaces. Since the quantitative growth of the high conductivity layer depends on the initial thickness or volume of the layer it is preferred that the conductivity have a thickness of at least 0.01 inches. The minimum thickness ensures sufficient dimensional growth to provide the metal bonding buffer as described above. This structure will also easily conform to stress-free bending when the rail path must follow tight curves.

The reduction of transfer resistance and increased power efficiency allows construction of a lighter weight rail relative to conventional rails thereby reducing installation and handling difficulties.

In an alternative embodiment of the invention, the aluminum cladding on one side of the rail web includes a longitudinal hole along the inside of the flange configured to house a heating cable, the heating cable intended to provide heat which is dissipated throughout the composite rail to eliminate freezing or icing in extreme environments.

In an another embodiment of the invention, the steel rail includes openings in the upper flange so that the aluminum forms part of the electrical contact surface. The openings are preferably in the form of elongate grooves. The size and configuration of the grooves is selected so that the steel portion satisfies the wear resistance requirements of the rail against wear from the collector shoe while maximizing the size of the openings to promote efficient energy transfer.

In a further embodiment the upper flange of the steel rail may also include a longitudinally extending groove which is in direct communication with the openings in the flange. The aluminum portion fills the groove so that the aluminum portion in the groove is substantially flush with the electrical contact surface. The groove is preferably longitudinally continuous and has a constant width across the steel beam. The preferred groove configuration provides a constant aluminum contact surface area thereby minimizing power flow pulsing.

It has been found that by replacing the collector shoe with copper, brass, or aluminum and including openings in the flange doubles the transfer resistance efficiency over a full steel flange to collector shoe transfer resistance efficiency.

Other features and advantages of the invention will become apparent from the accompanying description and the drawings.

BRIEF DESCRIPTION OF THE DRAWINGS

FIG. 7 is an isometric view of the rail having openings formed in both the upper and lower flanges;

FIG. 8 is a cross-sectional view of the rail of FIG. 7 along line VIII—VIII showing heater holes formed in the aluminum portion adjacent the top and bottom flanges with a heater cable positioned in the heater hole adjacent the upper flange;

FIG. 9 is an isometric view of the rail including a groove in the upper flange extending between the openings; and FIG. 10 is a cross-sectional view of the rail including the groove and the high conductivity layers.

DETAILED DESCRIPTION OF THE ILLUSTRATIVE EMBODIMENTS

Figure 1:
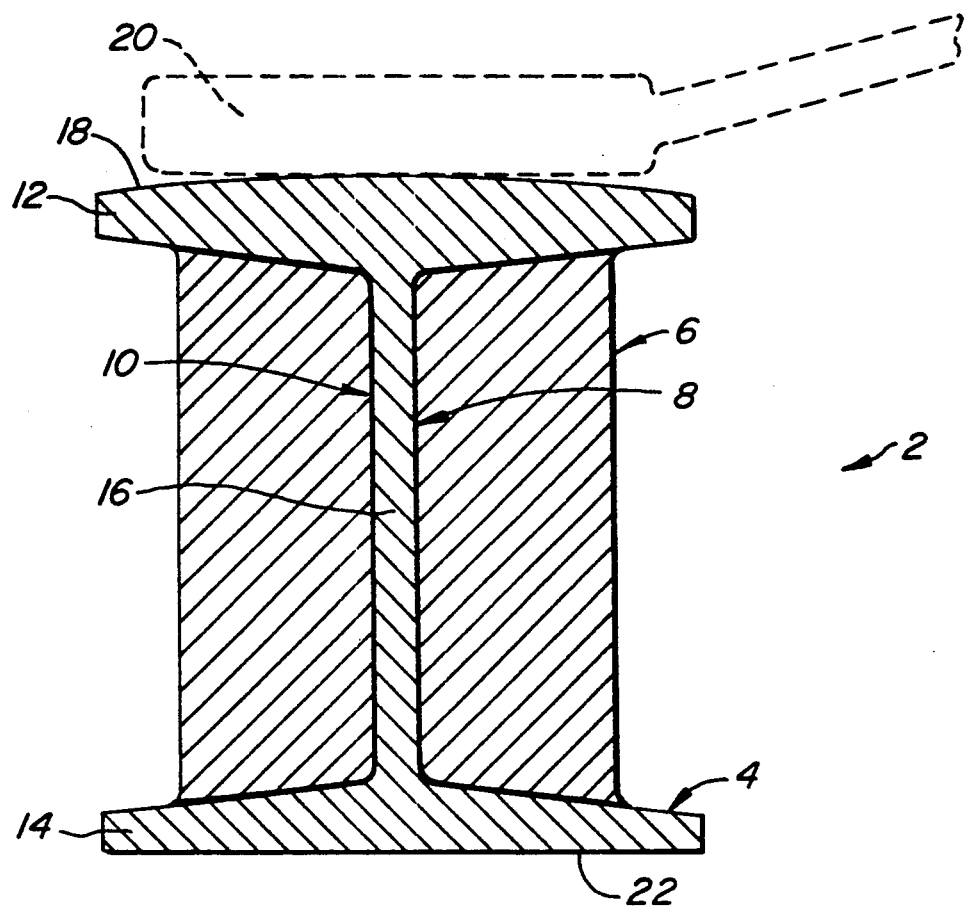
FIG. 1 is a front elevational view of the invention shown in cross-section.

Referring to FIG. 1, composite rail 2 is shown in the preferred configuration having an asymmetrical I-beam shape. It is intended that composite rail 2 be used as a power conducting rail, or third rail, functioning as an electrical bus bar for electrically powered rail vehicles. Composite rail 2 is configured to be employed in transportation systems having a wide range of system voltages and system currents. Conventional transportation systems use system voltages ranging from 550 VDC to 1,000 VDC and system current values ranging from 2,000 Amps to 6,000 Amps.

Composite rail 2 generally comprises steel portion 4, aluminum cladding 6, and high conductivity layers 8, 10 disposed therebetween. Steel portion 4 is made generally asymmetrical in cross-sectional configuration and includes upper flange 12, lower flange 14 and web 16. Preferably, steel portion 4 is fabricated from ferrous metal such as steel having a low carbon content conforming to American Society of Testing Materials Specification (ASTM) A-36 or a suitable alternative using conventional manufacturing techniques.

High conductivity layers 8, 10 are preferably made of copper as more fully described below, but other conductive materials such as brass could be used. It is intended that the material used for high conductivity layers 8, 10 has superior conductivity over low carbon steel and aluminum and excellent electrical and physical properties such as a high thermal coefficient and easy cold forming characteristics. High conductivity layers 8 and 10 are disposed between and cold formed to steel portion 4 prior to casting and to aluminum cladding 6 during the casting process as will also be more fully described below. The resulting composite rail 2 is formed as a one-piece integral unit in whatever length desired.

Steel portion 4 is made asymmetrical with upper flange 12 having a thicker cross-sectional dimension relative to lower flange 14 as illustrated in FIG. 1. Upper flange 12 is preferably contoured to have an upper surface 18 which is preferably convex with an approximate radius of 24 inches to provide a smooth contact surface with a contact shoe 20, shown illustrated in broken lines. The thickness of upper flange 14 increases wear along contact surface 18. Upper flange 12 is made approximately 20% thicker than bottom flange 14. The preferred width of upper flange 12 is approximately 3½ inches. Lower flange 14 includes a flat bottom surface 22 to facilitate level mounting onto a support surface (not shown). The thinner dimensions of lower flange 14 are selected to reduce material weight without compromising strength.

Preferably, composite rail 2 is manufactured into an integral unit using a casting process. Steel portion 4 is first fabricated in the desired cross-sectional configuration. High conductivity layers 8, 10 are prefabricated and positioned on either side of web 16 and contoured to fit along the lower surface of upper flange 12 and the upper surface of lower flange 14 in a shape dictated by steel portion 4. High conductivity layers 8, 10 are then pressed into steel portion 4 preferably by cold-rolling and thereby flattened against steel portion 4 to form a gap free sheath of material. High conductivity layers 8, 10, steel portion 4 and aluminum cladding 6 are then hot bonded together in a partial vacuum by casting liquid aluminum about and through web 16, thereby sandwiching high conductivity layers 8, 10 and creating an instant bond between all three materials.

Figure 2:
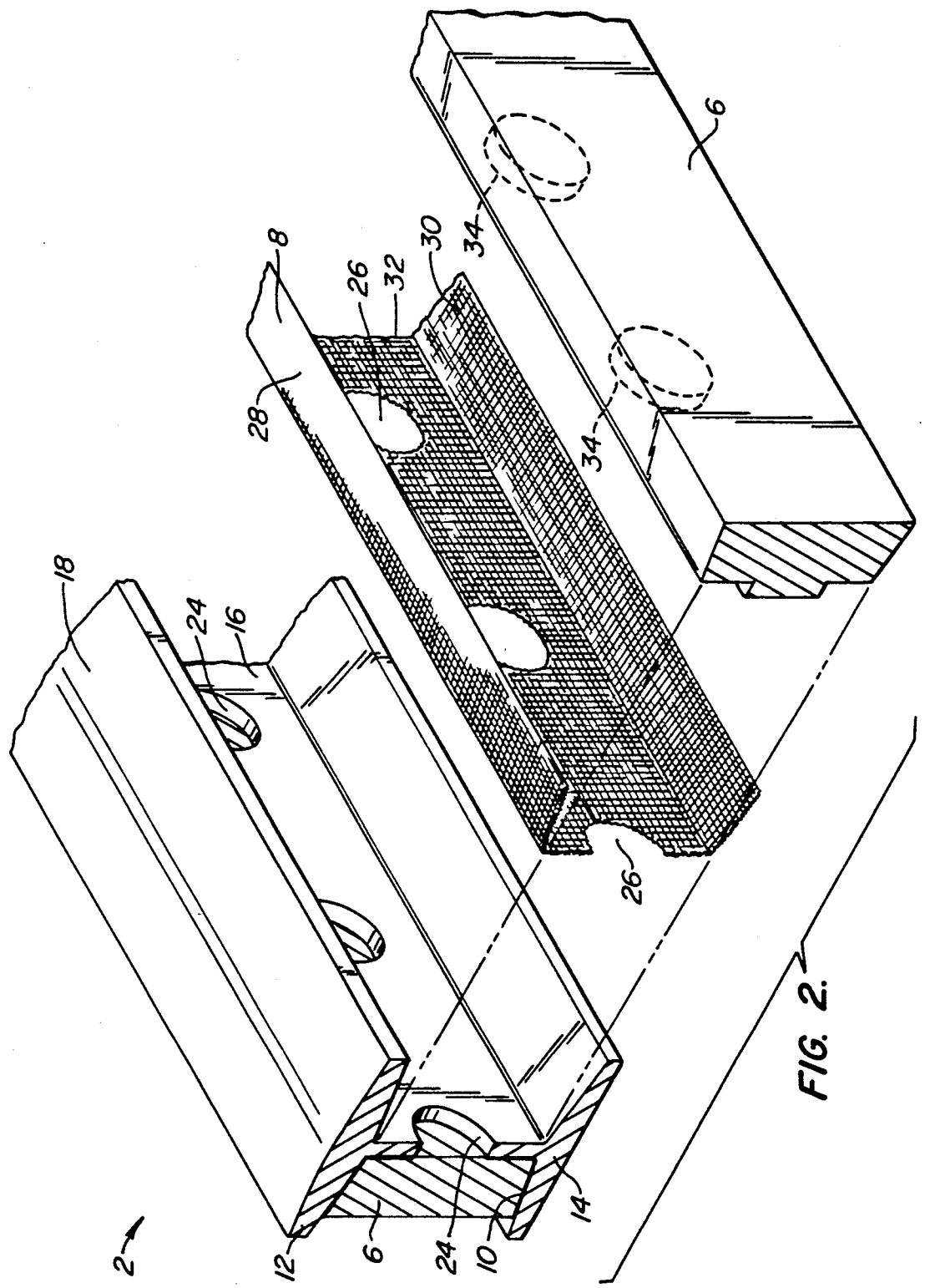
FIG. 2 is a partially exploded perspective view of the invention, showing one side of the aluminum cladding and the high conductivity layer separated from the rail web.

Composite rail 2 is illustrated in FIG. 2 in a partial exploded view to provide a more complete understanding of the interrelation and physical characteristics associated with high conductivity layers 8 and 10, steel portion 4 and aluminum cladding 6. Steel portion 4 is formed having regularly spaced apertures 24 in web 16. Apertures 24 are preferably made round, but can be oval, square or any desired shape. The regular spacing facilitates the flow of liquid aluminum to the other side of the web and interlocks the aluminum and the steel. When composite rail 2 is fabricated in dimensions similar to conventional power conducting rails, apertures 24 would be approximately 1½ inches in diameter and spaced approximately 2 to 3 inches apart center-to-center. Other cut-outs in addition to apertures 24 can be formed in web 16 to reduce steel weight and further increase contact surface area between the metals. Each high conductivity layer 8, 10 share common construction and are prefabricated prior to "assembly" during the casting. For purposes of brevity in this discussion, high conductivity layer 8, shown partially exploded from steel portion 4 in FIG. 2, is discussed in conjunction with the fabrication process of composite rail 2, it being understood that high conductivity layer 10 is constructed in a similar manner and therefore applies to the same discussion and fabrication processes.

High conductivity layers 8, 10 are preferably prefabricated of sixteen gauge copper mesh as indicated in FIG. 2 having upper side 28, lower side 30 and web side 32. Depending upon the particular operating currents and voltages in the particular rail application, the mesh size can range anywhere between 18 gauge and 12 gauge. High conductivity layers 8, 10 are positioned next to web 16 and cold rolled into web 16 prior to the aluminum casting process. During the cold rolling, high conductivity layers 8, 10 are flattened out to a thickness of approximately 0.010 inches. The conductivity layers preferably have a thickness in the range of 0.008 to 0.012 inches, although the thickness can vary depending on the application. This flattening presses high conductivity layers 8, 10 into steel portion 4 conforming them intimately to the surface contours of the steel portion by smearing the material onto steel portion 4 and eliminating any potential gaps or pockets. The round wires of the copper mesh existing before the cold rolling flatten into a thin sheath covering nearly 100% of the applicable steel surface. The illustration in FIG. 2 shows high conductivity layer 8 in the preferred pre-casting mesh configuration for illustration purposes only, it being understood that high conductivity layers 8, 10 are a thin, uniform laminate layer in the fully constructed rail. High conductivity layers 8, 10 can be prefabricated of other suitable materials having high electrical conductivity and desirable cold working characteristics if desired without departing from the intended invention.

Prior to the casting process, high conductivity layers 8, 10 are pressed onto web 16 between upper flange 12 and lower flange 14 with holes 26 aligning with apertures 24. As aluminum cladding 6 is cast around steel portion 4, copper sheaths 8, 10 are sandwiched between the molten aluminum and the steel. The temperature of the molten aluminum softens the high conductivity layers 8, 10 to help facilitate a bond. During casting molten aluminum is allowed to freely transfer between opposite sides of web 16 through holes 26 and apertures 24. As a result, aluminum casting legs 34 are formed through holes 26 and apertures 24 to integrally connect aluminum cladding 6 around and through web 16 of steel portion 4 sandwiching copper sheaths 8, 10 therebetween. The length of upper side 28 and lower side 30 of copper sheaths 8, 10 is selected such that copper sheaths 8 and 10 are completely sandwiched between aluminum cladding 6 and steel portion 4 and fully enveloped by aluminum cladding 6.

During the casting process it is preferred that E.C. aluminum, or suitable aluminum alloy, is introduced in a partial vacuum on either side of web 16 in a molten state at temperatures generally between 1,300° F. and 1,350° F. These melting temperatures are significantly below the melting temperatures of the materials used in steel portion 4 and below the melting temperature of the copper preferably used in high conductivity layers 8 and 10. As aluminum is cast around web 16 between upper flange 12 and lower flange 14, the temperature causes the copper of high conductivity layers 8 and 10 to plasticize slightly and mechanically bond to aluminum cladding 6 and steel portion 4. The surface of web 16 in steel portion 4 can be slightly roughed prior to cold rolling of high conductivity layers 8, 10 and casting to enhance bonding. The resulting mechanical bond nearly eliminates transfer resistance between steel portion 4 and aluminum cladding 6 and increases overall conductivity of the rail significantly.

After the casting process the solidified aluminum will be compressed between two rollers (upper and lower rollers) of a conventional rolling mill in two consecutive passes to press the composite metals against the inner flanges of the steel, thereby further increasing the instant bond of the metals.

When applicable, conventional power conducting rails use exposed heater elements mounted generally external to the rail construction. Heating elements are required in geographical regions where subfreezing temperatures are encountered and ice may form on the electrical contact surface of the rail. External heaters provide extremely poor heat distribution to the power rail surface due to heavy heat losses and non-uniform heat conduction distances. Typical heat requirements for an exposed heater element are approximately 600 watts or more per rail foot, a significant portion of this power requirement is lost due to heat loss to the ambient environment from the exposed heater element.

Figure 3:
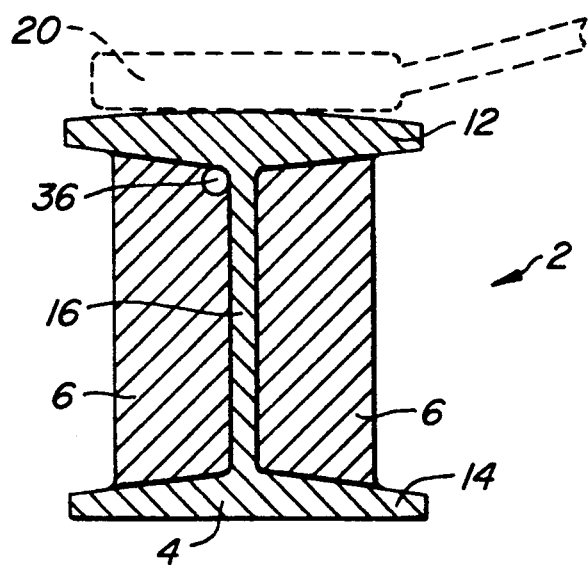
FIG. 3 is a front elevational view shown in cross-section of an alternative embodiment of the invention having a longitudinal hole formed in one side of the aluminum cladding for housing a heating cable.

An alternative embodiment of composite rail 2 is shown in FIG. 3. This embodiment can be employed in geographical areas subject to freezing temperatures. In this embodiment, composite rail 2 is constructed as previously described, but includes heater hole 36 formed between aluminum cladding 6 and steel portion 4 along the entire length of composite rail 2. Heater hole 36 can be formed using a removable tube during the casting process. Preferably, heater hole 36 is positioned at the curvature between upper portion 12 and web 16 as illustrated. This position provides maximum transfer of heat, supplied by a heater cable 39 (FIG. 7) longitudinally disposed within heater hole 36, to upper flange 12 to provide deicing and reduce snow buildup along contact surface 18. If desired, a second heater channel could be formed on the opposite side of web 16.

The positioning of internal heater hole 36 (FIG. 3) allows a fully enclosed heater cable or other heater element thereby substantially reducing heat loss and power requirements. Wherein a typical external heater element may require as much as 600 watts per rail foot or more, the internal heater path of the present invention provides comparable thermal results using only 100–120 watts per rail foot. Location of the heater cable near the upper flange 12 of composite rail 2 maximizes heat transfer to contact surface 18 and minimizes electrical contact shoe 20 slippage and fading of electrical power transfer to the rail vehicle during icing conditions. Because the heater element is fully enclosed, the heater element is also physically protected from corrosion, impact damage and environmental heat losses.

Figure 4:
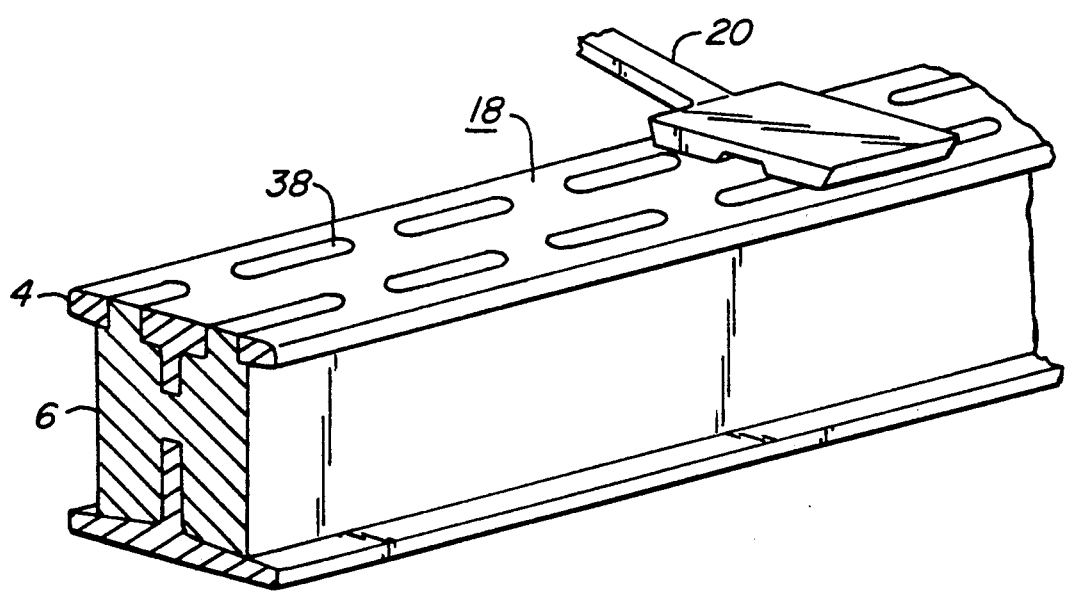
FIG. 4 is an isometric view of an alternative embodiment of the invention with openings in the upper flange of the steel rail in the shape of elongated slots.

FIG. 4 illustrates another embodiment of the invention in which the upper flange 12 includes openings 38 which further reduce the power transfer resistance. When the aluminum cladding 6 is cast about the steel beam of FIG. 4, the aluminum enters and fills openings 38 so that the aluminum forms part of the upper contact surface 18. The openings 38 are preferably elongated slots.

The surface of the aluminum cladding 6 which forms part of the upper contact surface 18 increases the power transfer efficiency of the rail by bringing the high conductive material, preferably aluminum, into direct contact with the collector shoe 20. The aluminum, now part of the top flange metal mass, preferably accounts for about 30% of the total steel/aluminum mass (by volume) of the top flange metal volume. The increased aluminum mass significantly increases the electrical energy capacity of the top flange which, in turn, greatly improves the power transfer capacity of the rail flange to the collector shoe 20. The direct contact between aluminum and collector shoe also reduces the transfer resistance between the top flange and the collector shoe. The remaining steel portions in the contact surface still provide wear resistance for frictional contact with the collector shoe 20 sliding along the rail and protect the aluminum in the slots against excessive wear.

The dimensions of the openings 38 are selected to provide enough steel area so that frictional wear, due to contact with the collector shoe wear, is not a problem while maximizing the surface area of aluminum to increase the power transfer efficiency. In a preferred embodiment, the slots have a length of 2 inches, a width of 5/8 inches, and are longitudinally spaced 3/8 inch apart. The slots are about ½ inch from the centerline of the vertical web axis.

The rail of FIG. 4 is formed by casting the aluminum cladding 6 about the steel portion 4, as described above. The aluminum will flow into the elongated grooves and penetrate to the surface of the top flange. A set of adjustable mold plates sliding on top of the flange surface during casting ensures that the aluminum will be flush with the top surface of the flange. If desired the top surface of the rail can be ground to assure a smooth surface finish.

Figure 5:
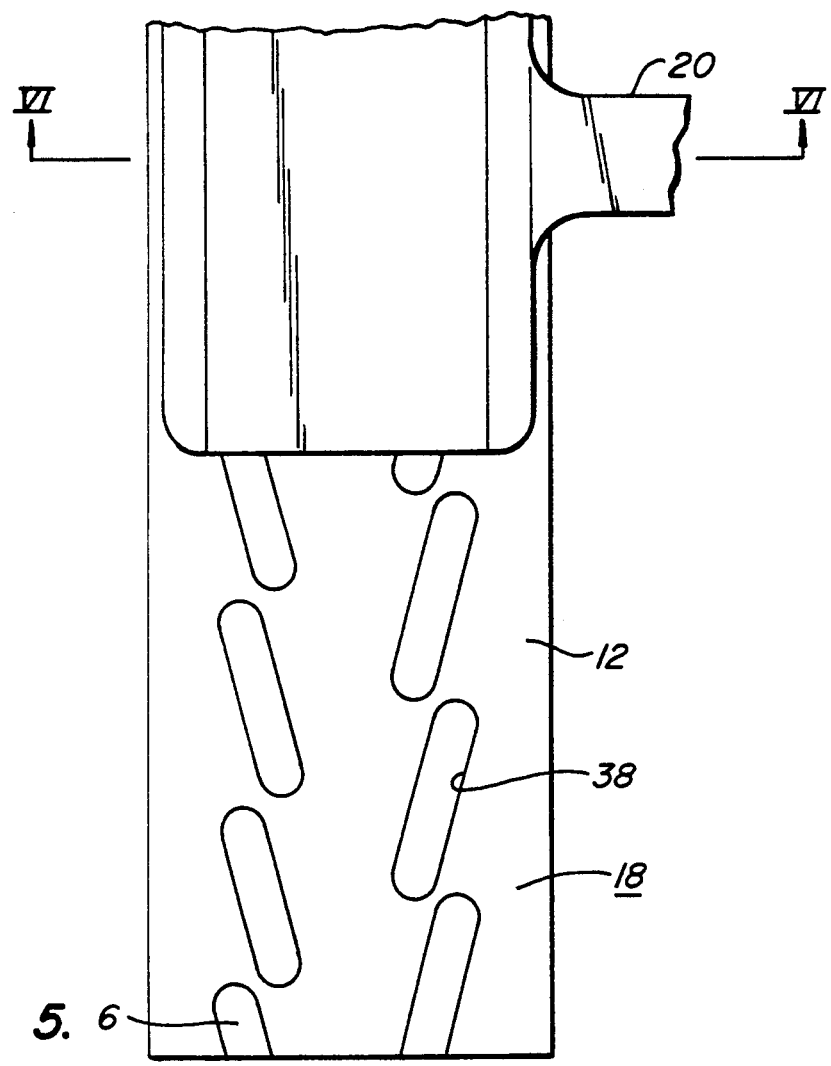
FIG. 5 is an plan view of the embodiment shown in FIG. 4 with openings formed in the upper flange in the shape of elongate slots having an axis which is skewed with respect to the longitudinal axis of the rail.

FIG. 5 shows yet another embodiment of the invention in which the openings 38 are formed as elongated slots having an opening longitudinal axis which is skewed with respect to the longitudinal axis of the rail, preferably at an angle in the range of between about 12° and 15°. In the preferred embodiment, the openings 38 overlap longitudinally. The openings 38 may, however, be longitudinally spaced similar to the embodiment depicted in FIG. 4. The openings 38 have the same preferred dimensions as described above in connection with FIG. 4.

Figure 6:
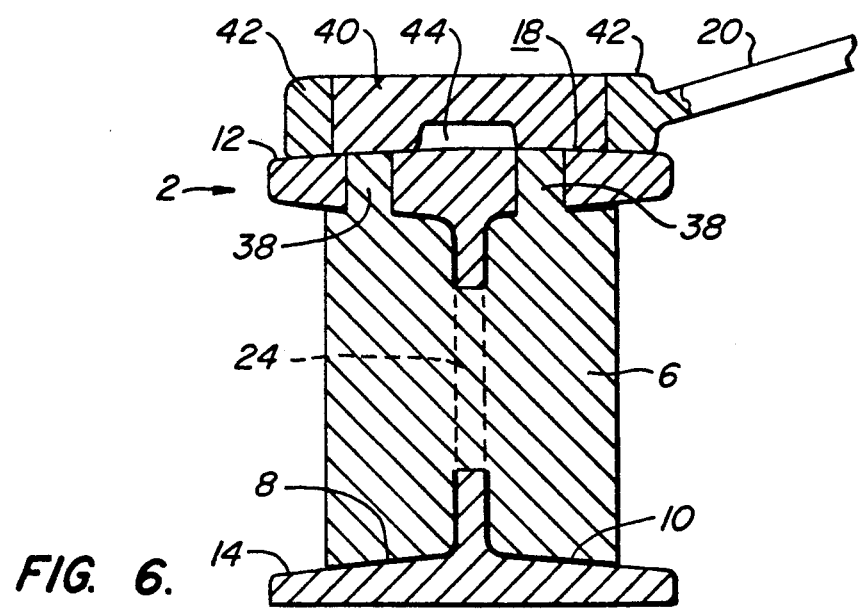
FIG. 6 is a cross-sectional view of the rail and collector shoe of FIG. 5 along line VI—VI.

FIG. 6 illustrates a preferred collector shoe 20. The collector shoe includes a high conductivity section 40, which is preferably copper, brass, or aluminum, and a steel section 42. The high conductivity section 40 is sized and positioned to be in direct contact with at least a portion of the aluminum 6 in openings 38 forming part of the contact surface 18. The steel section is sized and positioned to be in contact with the steel part of the contact surface 18. The steel section 42 is designed to take the frictional wear between the collector shoe 20 and the rail 2. A gap 44 is formed in the middle of the collector shoe 20 positioned to be directly over the central axis of the rail. Preferred dimensions of the collector shoe are a width of 3 inches, a length of 6 inches, and a thickness of 5/8 inches. A preferred width of the collector shoe arm is ½ inch.

The embodiments depicted in FIGS. 4-6 also include apertures 24 formed in the web of the steel beam as described above. In addition, the alternate embodiments of FIGS. 4-6 also preferably include the high conductivity layers 8, 10 described above although the advantages of the partial aluminum rail contact surface provided by the embodiment of the invention is attained even when the high conductivity layers are deleted.

FIGS. 7 and 8 illustrate the rail including openings 38 formed in both the upper and lower flanges. After the upper flange has worn down so that it can no longer be used, the rail can be turned over so that the bottom surface of the bottom flange can be utilized as a further electrical contact surface 41. This feature permits the same rail to be used twice with the only added cost being the field labor required to reset the rail. The rail is symmetrical about a horizontal axis 37 and the bottom and top flanges preferably have approximately the same thickness. The top and bottom flanges are preferably rounded and have a preferred radius of curvature of about 24 inches. The openings 38 have the same preferred dimensions as described above in connection with FIGS. 4-6. The production cost of the rail of FIGS. 7 and 8 is not increased significantly if twin set tooling is used to form the openings in both flanges. The rail of FIGS. 7 and 8 may also include the high conductivity layers 8, 10, apertures 24, heater holes 36 and heater cables.

The aluminum filled areas separated from a continuous aluminum area by a steel gap of approximately 3/8 inch might induce minor power flow pulsing. If it occurs at all it will be insignificant to the power supply for the traction motor since the collector shoe engagement with the top rail surface and the exposed aluminum area will be at all times in excess of 85% thereby minimizing any possible power voltage drop.

FIGS. 9 and 10 illustrate an alternate embodiment of the invention in which the steel rail includes a groove 46 extending over the length of the rail in alignment and communication with the openings 38. The openings 38 have the same dimensions and spacing as those described above in connection with the embodiment of FIG. 4. The groove 46 is given a suitable form and shape but preferably has a width of between about ½" and 5/8" inches across the width of the rail. The groove 46 has a preferred depth of between 5/16" and 3/8" inches.

The groove 46 is filled with aluminum to form a longitudinal aluminum contact strip 47 in the upper surface of the flange which minimizes the above mentioned power flow pulsing by maintaining constant contact between the aluminum contact strip and the contact shoe. Power flow pulsing is further minimized because the aluminum to contact shoe contact area remains constant since the aluminum contact strip 47 in the groove extends uninterrupted over the full length of the rail. The steel rail of FIGS. 9 and 10 also optionally includes apertures 24, high conductivity layers 8, 10, heater holes 36, and heater cables 39 which are constructed and function as previously described. The rail of FIG. 9 also optionally includes the groove 46 and openings 38 formed in the bottom flange so that the rail may be turned 180° over as described above to effectively double its life span through a dual use application.

The foregoing description of the preferred embodiments of the invention have been presented for purposes of illustration and description. It is not intended to be exhaustive or to limit the invention to the precise form disclosed, and obviously many modifications and variations are possible in light of the above teaching. For example, steel portion 4 could be configured in a H-shape, Y-shape or other shape required by the particular application. Also, high conductivity layers 8, 10 can be made from a wide range of conductive materials and thicknesses selected to meet the performance criteria discussed. The embodiments chosen and described in this description were selected to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A power conductor rail system comprising:
   a steel rail including a longitudinal axis, a flange having an upper surface, a web integrally formed with the flange, and a groove formed in the flange, the groove penetrating the upper surface and extending parallel to the longitudinal axis; and
   an aluminum portion secured to the steel rail, the aluminum portion filling the groove so that the aluminum portion is substantially flush with the upper surface of the steel rail, the aluminum portion in the groove and the upper surface forming an electrical contact surface.

2. The power conductor rail system according to claim 1 wherein:
the aluminum portion is cast about the steel rail to create an integral structure.

3. The power conductor rail system according to claim 1 wherein the flange includes a lower surface, an other aluminum portion adjacent a lower side of the flange, and an aluminum connection between the aluminum portion in the groove and the other aluminum portion for conducting electrical current between the aluminum portion and the other aluminum portion.

4. The power conductor rail system according to claim 3 wherein:
the other aluminum portion is positioned against the web.

5. The power conductor rail system according to claim 3 wherein:
the flange includes a plurality of openings extending between a lower surface and the upper surface of the flange; and
the aluminum connection is positioned in the plurality of openings in the flange.

6. The power conductor rail system according to claim 3 further comprising:
a high conductivity layer at least partially positioned between the other aluminum portion and the steel rail.

7. The power conductor rail system according to claim 6 wherein:
the high conductivity layer comprises copper.

8. The power conductor rail system according to claim 6 wherein:
the high conductivity layer has a thickness of at least 0.010 inches.

9. A power conductor rail system comprising:
a steel rail including a flange defining an electrical contact surface, the flange having a plurality of openings therethrough and a groove extending in a longitudinal direction of the rial and in continuous communication with the plurality of openings; and
an aluminum portion secured to the steel rail, the aluminum portion filling the plurality of openings so that the aluminum portion is substantially flush with the electrical contact surface, the aluminum portion filling the groove so that the aluminum portion the groove is substantially flush with the electrical contact surface and longitudinally continuous between the plurality of openings.

10. A power conductor rail system comprising:
a steel rail including a flange defining an electrical contact surface, the flange having a plurality of openings therethrough, the flange including a groove extending in a longitudinal direction of the rail and in continuous communication with the plurality of openings, the groove extending over a full length of the rail; and
an aluminum portion secured to the steel rail, the aluminum portion filling the plurality of openings so that the aluminum portion is substantially flush with the electrical contact surface, the aluminum portion filling the groove so that the aluminum portion in the groove is substantially flush with the electrical contact surface and longitudinally continuous between the plurality of openings.

11. A power conductor rail system comprising:
a steel rail including a flange, a plurality of openings extending from an upper surface to a lower surface of the flange, a groove formed in the flange and penetrating the upper surface, the groove being continuous in a longitudinal direction of the steel rail;
an aluminum portion secured to the steel rail, the aluminum portion filling the groove so that the aluminum portion is substantially flush with the upper surface of the steel rail, the aluminum portion in the groove and the upper surface forming an electrical contact surface;
an other aluminum portion adjacent the lower surface of the flange; and
an aluminum connection between the aluminum portion in the groove and the other aluminum portion for conducting electrical current between the aluminum portion and the other aluminum portion.

* * * * *